(12) United States Patent
Nakano

(10) Patent No.: US 11,725,841 B2
(45) Date of Patent: Aug. 15, 2023

(54) CONTROLLER AND AIR CONDITIONING SYSTEM BASED ON USER INFORMATION, USER REGISTRATION INFORMATION AND POSITIONAL INFORMATION OF TEMPERATURE DETECTED BY SENSOR TERMINAL NEAR USER

(71) Applicant: Mitsubishi Electric Corporation, Tokyo (JP)

(72) Inventor: Satoshi Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/050,000

(22) PCT Filed: Jul. 13, 2018

(86) PCT No.: PCT/JP2018/026498
§ 371 (c)(1),
(2) Date: Oct. 23, 2020

(87) PCT Pub. No.: WO2020/012641
PCT Pub. Date: Jan. 16, 2020

(65) Prior Publication Data
US 2021/0231339 A1 Jul. 29, 2021

(51) Int. Cl.
*F24F 11/64* (2018.01)
*F24F 11/80* (2018.01)
(Continued)

(52) U.S. Cl.
CPC .............. *F24F 11/64* (2018.01); *F24F 11/80* (2018.01); *G05B 19/042* (2013.01);
(Continued)

(58) Field of Classification Search
CPC ........ F24F 11/64; F24F 11/80; F24F 2120/12; F24F 2110/10; F24F 11/30; G05B 19/042;
(Continued)

(56) References Cited

U.S. PATENT DOCUMENTS

2008/0083834 A1* 4/2008 Krebs ................ F24F 11/62
237/2 A
2010/0286843 A1* 11/2010 Lyon ................ G05D 23/1932
703/1
(Continued)

FOREIGN PATENT DOCUMENTS

JP H01-302051 A 12/1989
JP 2011-185471 A 9/2011
(Continued)

OTHER PUBLICATIONS

International Search Report of the International Searching Authority dated Sep. 25, 2018 for the corresponding International application No. PCT/JP2018/026498 (and English translation).
(Continued)

*Primary Examiner* — Alicia M. Choi
(74) *Attorney, Agent, or Firm* — Posz Law Group, PLC

(57) ABSTRACT

A controller includes: a processor and a memory. The memory stores floor map information indicating a position of each sensor terminal in a room air-conditioned by an air conditioner. The memory also stores user registration information including first identification information indicating a user who may be in the room and positional information indicating a position occupied by the user when the user is in the room. The processor periodically acquires, from a user terminal, user information including second identification information indicating the user using the user terminal and target temperature information. The processor controls, when the user using the user terminal is in the room, the air
(Continued)

conditioner such that temperature detected by one of the sensor terminals at a position near the user in the room approaches target temperature indicated in the target temperature information based on floor map information, user registration information, and user information.

7 Claims, 11 Drawing Sheets

(51) Int. Cl.
  *G05B 19/042* (2006.01)
  *F24F 120/12* (2018.01)
  *F24F 110/10* (2018.01)
(52) U.S. Cl.
  CPC ....... *F24F 2110/10* (2018.01); *F24F 2120/12* (2018.01); *G05B 2219/2614* (2013.01)
(58) Field of Classification Search
  CPC . G05B 2219/2614; G06Q 10/06; G06Q 10/10
  See application file for complete search history.

(56) References Cited

U.S. PATENT DOCUMENTS

| | | | | |
|---|---|---|---|---|
| 2015/0204551 A1* | 7/2015 | Nair | ........................ | F24F 11/70 |
| | | | | 165/217 |
| 2015/0316281 A1* | 11/2015 | Yabuta | ..................... | F24F 11/63 |
| | | | | 700/276 |
| 2015/0350407 A1* | 12/2015 | Hsu | ........................ | G06F 1/206 |
| | | | | 455/418 |
| 2016/0047565 A1* | 2/2016 | Robinson | ............... | G05B 15/00 |
| | | | | 700/278 |
| 2016/0258641 A1* | 9/2016 | Cheatham, III | ......... | F24F 11/67 |
| 2016/0258643 A1* | 9/2016 | Cheatham, III | ......... | F24F 11/67 |
| 2017/0045866 A1* | 2/2017 | Hou | ..................... | H04L 12/2825 |
| 2018/0121571 A1* | 5/2018 | Tiwari | ..................... | G06F 30/13 |
| 2018/0284819 A1* | 10/2018 | McDaniel | ............. | G05B 15/02 |
| 2019/0171171 A1* | 6/2019 | Verteletskyi | ......... | G06Q 50/163 |
| 2019/0179268 A1* | 6/2019 | Gervais | ................ | G05B 13/027 |
| 2019/0301765 A1* | 10/2019 | Kobayashi | ............ | B60L 3/0092 |
| 2019/0323717 A1* | 10/2019 | Xu | ........................... | F24F 11/70 |
| 2020/0077800 A1* | 3/2020 | Schmidt | ................ | A47C 7/748 |
| 2021/0088241 A1* | 3/2021 | Goodman | ................ | F24F 11/30 |
| 2021/0247094 A1* | 8/2021 | Joshi | ........................ | F24F 11/64 |

FOREIGN PATENT DOCUMENTS

| | | | | |
|---|---|---|---|---|
| JP | 2017-187195 A | 10/2017 | | |
| JP | 2017-219275 A | 12/2017 | | |
| WO | WO2014162509 A1 * | 9/2014 | ............. | F24F 11/30 |
| WO | 2014/162509 A1 | 10/2014 | | |
| WO | 2017/168668 A1 | 3/2016 | | |
| WO | 2018/066035 A1 | 4/2018 | | |

OTHER PUBLICATIONS

Office Action dated Aug. 3, 2021 issued in corresponding JP patent application No. 2020-529950 (and English translation).
Office Action dated Oct. 8, 2021 issued in corresponding CN patent application No. 201880095159.2 with an English machine translation.
Office Action dated Jan. 4, 2022 issued in corresponding JP patent application No. 2020-529950 with an English machine translation.

* cited by examiner

CONTROLLER AND AIR CONDITIONING SYSTEM BASED ON USER INFORMATION, USER REGISTRATION INFORMATION AND POSITIONAL INFORMATION OF TEMPERATURE DETECTED BY SENSOR TERMINAL NEAR USER

CROSS REFERENCE TO RELATED APPLICATION

This application is a U.S. national stage application of International Patent Application No. PCT/JP2018/026498 filed on Jul. 13, 2018, the disclosure of which is incorporated herein by reference.

TECHNICAL FIELD

The present invention relates to a controller that controls an air conditioner, and to an air conditioning system.

BACKGROUND

Patent Literature 1 discloses an example of a conventional air conditioner. The air conditioner described in Patent Literature 1 computes the difference between the temperature detected by the sensor attached to the remote controller (hereinafter referred to as the remote) and the temperature at the position of the user on the basis of the position of the remote, the position of the user, and the temperature detected by the sensor, and performs air conditioning such that the temperature at the position of the user becomes the target temperature.

PATENT LITERATURE

Patent Literature 1: Japanese Patent Application Laid-open No. H1-302051

The air conditioner described in Patent Literature 1 performs air conditioning using the temperature detected by the sensor attached to the remote. This is problematic because as the difference between the position of the user and the position of the remote becomes large, the error between the actual temperature at the position of the user and the target temperature which is the temperature desired by the user becomes large.

SUMMARY

The present invention has been made in view of the above, and an object thereof is to obtain a controller capable of controlling an air conditioner such that the difference between the actual temperature at the position of the user and the target temperature becomes small.

In order to solve the above problem and achieve the object, a controller according to the present invention includes: a floor-map-information storing unit storing floor map information, the floor map information indicating a position of each of a plurality of sensor terminals installed in a room, the room being air-conditioned by an air conditioner; and a user-registration-information storing unit storing user registration information, the user registration information including first identification information and positional information, the first identification information indicating a user, the user having potential to be in the room, the positional information indicating a position occupied by the user when the user is in the room. The controller also includes: a user information acquiring unit acquiring user information from a user terminal used by the user, the user information including second identification information and target temperature information, the second identification information indicating the user using the user terminal; and an air-conditioning control unit controlling, when the user using the user terminal is in the room, the air conditioner such that a temperature approaches a target temperature indicated in the target temperature information, the temperature being detected by one of the sensor terminals at a position near the user in the room, the controlling being performed on a basis of the floor map information, the user registration information, and the user information.

The controller according to the present invention achieves the effect of enabling control of an air conditioner such that the difference between the actual temperature at the position of the user and the target temperature becomes small.

DETAILED DESCRIPTION

Hereinafter, a controller and an air conditioning system according to embodiments of the present invention will be described in detail with reference to the drawings. The present invention is not limited to the embodiment.

Embodiment

Figure 1:
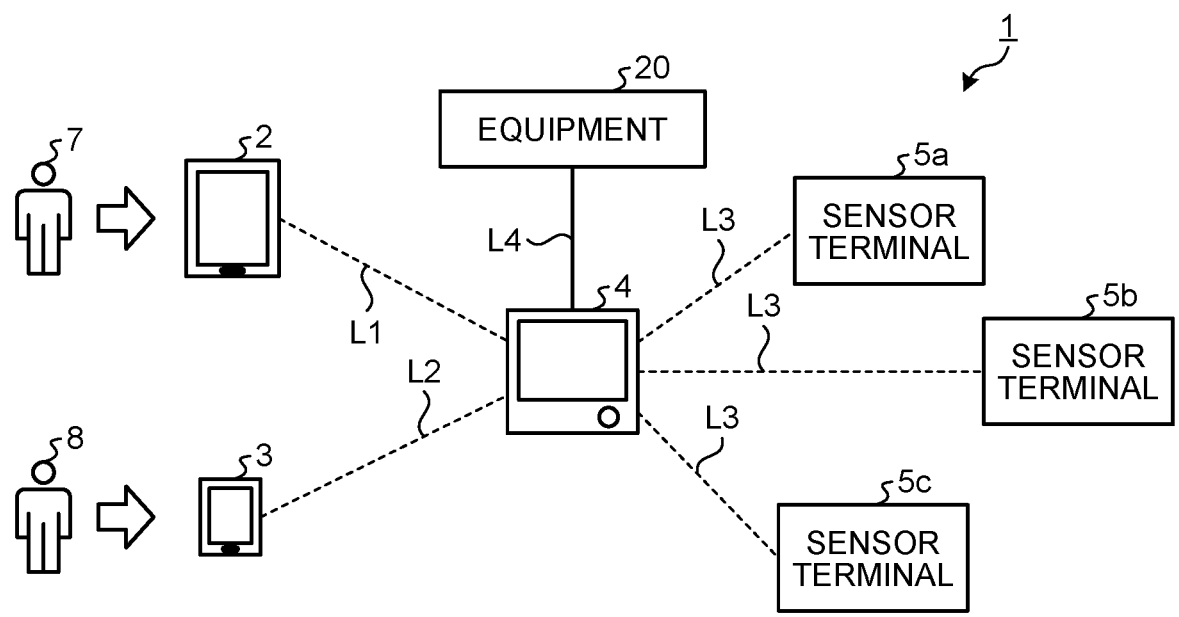
FIG. 1 is a diagram illustrating an exemplary configuration of an air conditioning system according to an embodiment of the present invention.

FIG. 1 is a schematic diagram illustrating an exemplary configuration of an air conditioning system according to an embodiment of the present invention. The air conditioning system 1 according to the present embodiment includes a setting terminal 2, a user terminal 3, a controller 4, sensor terminals 5a, 5b, and 5c, and equipment 20. The equipment 20 in the present embodiment is an air conditioner. In the following description, when it is not necessary to distinguish between the sensor terminals 5a, 5b, and 5c, such as when describing features common to the sensor terminals 5a, 5b, and 5c, these are referred to as the sensor terminal 5. Although FIG. 1 depicts an example in which the number of sensor terminals 5 constituting the air conditioning system 1 is three, the number of sensor terminals 5 only needs to be two or more. That is, the number of sensor terminals 5 constituting the air conditioning system 1 may be two, or four or more.

As illustrated in FIG. 1, the setting terminal 2 and the controller 4 are connected by wireless communication L1. The user terminal 3 and the controller 4 are connected by wireless communication L2. Each of the plurality of sensor terminals 5 is connected to the controller 4 by wireless communication L3. The equipment 20 and the controller 4 are connected by wire communication L4. Note that the equipment 20 and the controller 4 may be connected by wireless communication. Each of the plurality of sensor terminals 5 may be connected to the controller 4 by wire communication. A plurality of setting terminals 2 may be connected to the controller 4. Similarly, a plurality of user terminals 3 may be connected to the controller 4. A plurality of pieces of equipment 20 may be connected to the controller 4.

The setting terminal 2 is operated by an installer 7 of the equipment 20. The setting terminal 2 is used when the installer 7 configures necessary initial settings and the like before starting the operation of the equipment 20 and each sensor terminal 5. The setting terminal 2 is a laptop personal computer, a tablet terminal, a smartphone, or the like, and includes an input unit that receives an operation from the installer 7, a display unit that displays a menu screen for receiving an operation from the installer 7, and the like.

The user terminal 3 is operated by a user 8. The user terminal 3 is used when the user configures the settings of the equipment 20, operates the equipment 20, and the like. A single user terminal 3 is carried by the user 8 and is operated by the user 8 when the equipment 20 needs to be operated. That is, the user terminal 3 is used by the same user 8. The user terminal 3 is a smartphone or the like, and includes an input unit that receives an operation from the user 8, a display unit that displays a menu screen for receiving an operation from the user 8, and the like.

The controller 4 controls the operation of the equipment 20 on the basis of the result of detection by the sensor terminal 5. Because the equipment 20 of the present embodiment is an air conditioner, the controller 4 instructs the equipment 20 to start operation, end operation, adjust temperature, adjust humidity, adjust air volume, adjust wind direction, and the like.

The sensor terminal 5 has at least a function of measuring temperature, and transmits a measurement value representing a measured temperature to the controller 4. The sensor terminal 5 is implemented by, for example, hardware including a temperature sensor and a wireless communication device. The sensor terminal 5 may have a function of measuring humidity or the like in addition to temperature.

The equipment 20 is an air conditioner as described above, and air-conditions the room equipped with the air conditioning system 1 in accordance with an instruction from the controller 4.

Figure 2:
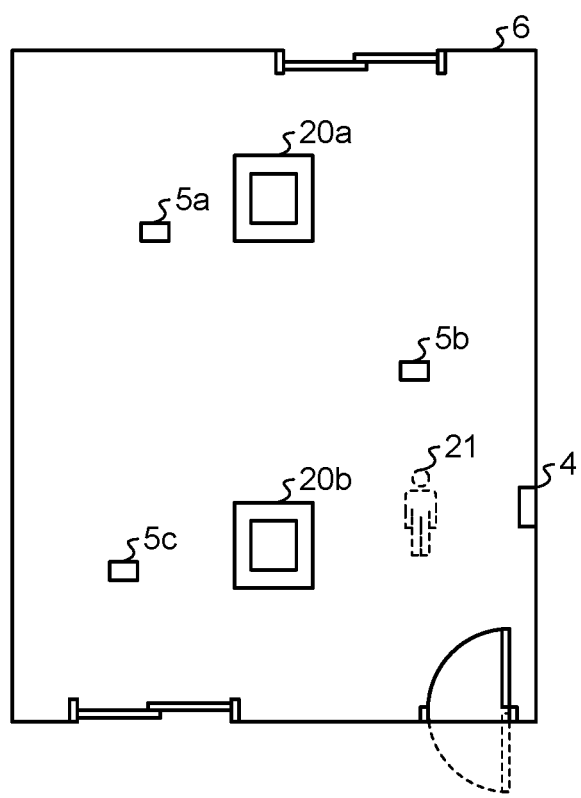
FIG. 2 is a diagram illustrating an example of the arrangement of each device constituting the air conditioning system according to the embodiment of the present invention.

FIG. 2 is a diagram illustrating an example of the arrangement of each device constituting the air conditioning system 1 according to the embodiment of the present invention. In the example illustrated in FIG. 2, indoor units 20a and 20b of the air conditioner corresponding to the equipment 20 illustrated in FIG. 1 are installed on the ceiling of a room 6 that is air-conditioned by the air conditioner, and the controller 4 is installed on the wall of the room 6. The sensor terminals 5a, 5b, and 5c are distributed in the room 6 at some distance from each other. The room 6 is, for example, a company office, and a position 21 of the user in the room 6 is assumed to be predetermined.

Figure 3:
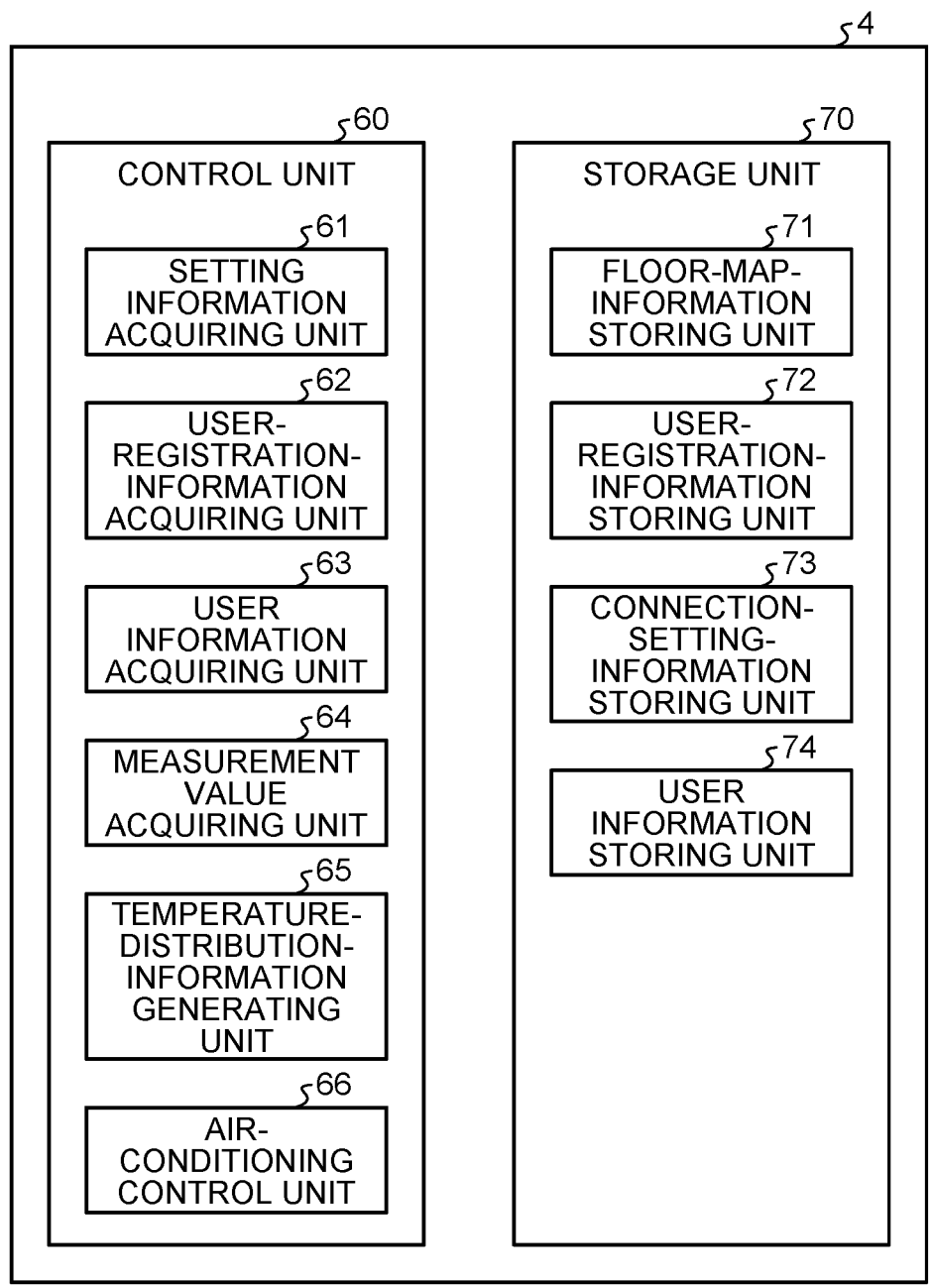
FIG. 3 is a diagram illustrating an exemplary configuration of the controller illustrated in FIG. 1.

FIG. 3 is a diagram illustrating an exemplary configuration of the controller 4 illustrated in FIG. 1. The controller 4 includes a control unit 60 and a storage unit 70. The control unit 60 includes a setting information acquiring unit 61, a user-registration-information acquiring unit 62, a user information acquiring unit 63, a measurement value acquiring unit 64, a temperature-distribution-information generating unit 65, and an air-conditioning control unit 66. The storage unit 70 includes a floor-map-information storing unit 71, a user-registration-information storing unit 72, a connection-setting-information storing unit 73, and a user information storing unit 74. The controller 4 may further include, for example, a display unit that displays the operation state of the equipment 20, the connection state of the setting terminal 2, the connection state of the user terminal 3, the connection state of the sensor terminal 5, and the like, and an input unit that receives operations by the installer 7 and the user 8.

The setting information acquiring unit 61 acquires setting information for the air conditioning system 1 from the setting terminal 2 illustrated in FIG. 1. Setting information for the air conditioning system 1 includes floor map information indicating the positions of the equipment 20 and each sensor terminal 5, and connection setting information that is information for wirelessly connecting the controller 4 and each sensor terminal 5. In a case where the arrangement of each device constituting the air conditioning system 1 is as illustrated in FIG. 2, floor map information indicates which positions in the room 6 the indoor units 20a and 20b and the sensor terminals 5a, 5b, and 5c are installed in. Connection setting information includes the identification information on the sensor terminal 5 and the information on the channel to be used.

The user-registration-information acquiring unit 62 acquires, from the user terminal 3 illustrated in FIG. 1, user registration information that is information about a user who has potential to be in the room that is air-conditioned by the air conditioning system 1. User registration information is information that the user 8 needs to register in advance with the controller 4 using the user terminal 3, and includes the identification information on the user 8 and the positional information on the user 8. The positional information on the user 8 is information indicating the position occupied by the user 8 when the user 8 is in the room that is air-conditioned by the air conditioning system 1. The identification information on the user 8 may be any information that uniquely identifies the user 8. For example, in a case where the air conditioning system 1 is used in a company office, the employee number of the user 8 may be used as the identification information on the user 8. The identification information on the user 8 included in the user registration information is first identification information indicating the user who has potential to be in the room that is air-conditioned by the air conditioner.

The user information acquiring unit 63 acquires, from the user terminal 3 illustrated in FIG. 1, user information that is information about the user 8 who is using the user terminal 3. User information includes at least the identification information and target temperature information on the user 8 who is using the user terminal 3. The identification information on the user 8 included in the user information is second identification information indicating the user 8 who is using the user terminal 3. The user information may include other types of information. Other types of information can be target humidity information, air volume information, wind direction information, and the like.

The measurement value acquiring unit 64 acquires, from the sensor terminal 5, a measurement value indicating the result of measurement by the sensor terminal 5.

The temperature-distribution-information generating unit 65 generates temperature distribution information representing the state of temperature in the room that is air-conditioned by the air conditioning system 1. The temperature-distribution-information generating unit 65 also transmits the temperature distribution information to the user terminal 3 connected to the controller 4.

The air-conditioning control unit 66 instructs the equipment 20, or the air conditioner, to operate.

The floor-map-information storing unit 71 stores the floor map information acquired by the setting information acquiring unit 61.

The user-registration-information storing unit 72 stores the identification information and positional information on the user 8 acquired by the user-registration-information acquiring unit 62.

The connection-setting-information storing unit 73 stores the connection setting information acquired by the setting information acquiring unit 61.

The user information storing unit 74 stores the user information acquired by the user information acquiring unit 63.

Figure 4:
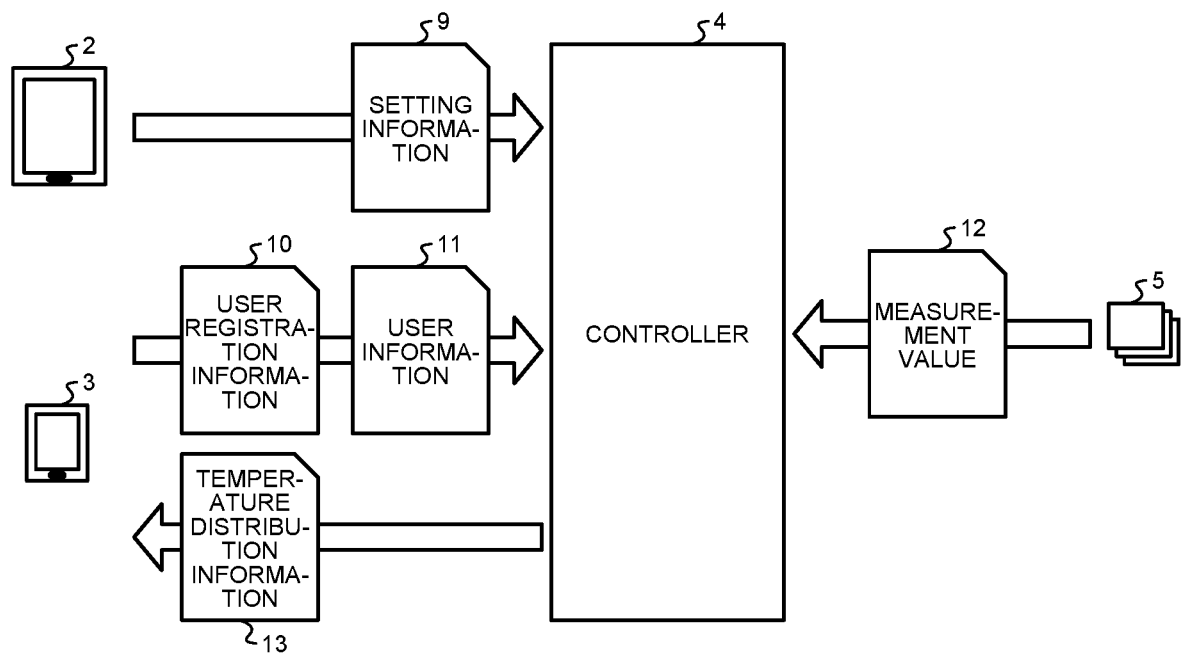
FIG. 4 is a diagram illustrating information transmitted and received by the controller according to the embodiment to and from other devices constituting the air conditioning system.

FIG. 4 is a diagram illustrating information transmitted and received by the controller 4 according to the embodiment to and from other devices constituting the air conditioning system 1. As illustrated in FIG. 4, the setting terminal 2 transmits, to the controller 4, setting information 9 including floor map information and connection setting information. The user terminal 3 transmits user registration information 10 and user information 11 to the controller 4. The sensor terminal 5 transmits a measurement value 12 to the controller 4. The controller 4 transmits temperature distribution information 13 to the user terminal 3.

Figure 5:
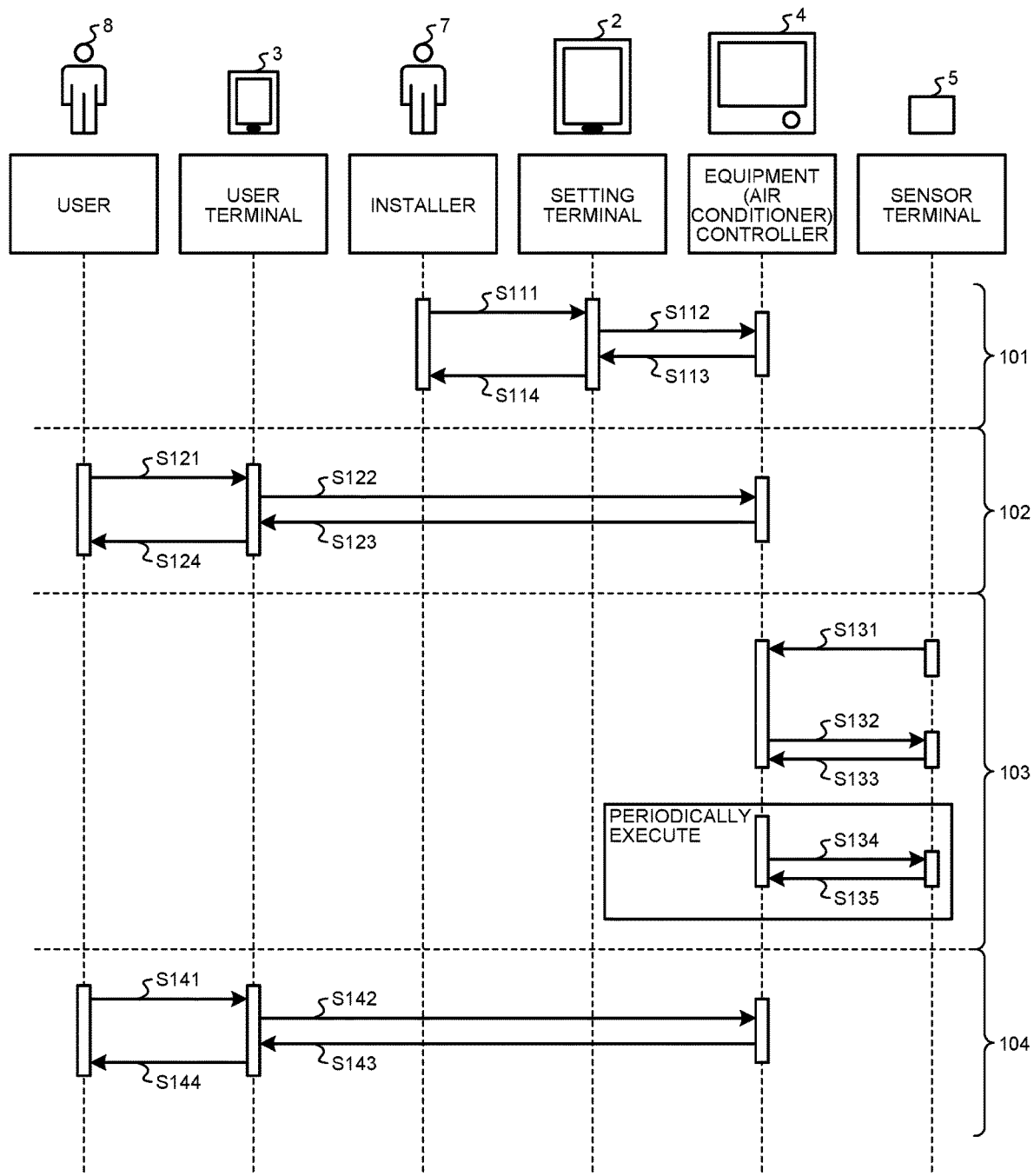
FIG. 5 is a diagram illustrating examples of communication sequences between the controller according to the embodiment and other devices constituting the air conditioning system.

FIG. 5 is a diagram illustrating examples of communication sequences between the controller 4 according to the embodiment and other devices constituting the air conditioning system 1.

The sequence 101 illustrated in FIG. 5 is a communication sequence between the setting terminal 2 and the controller 4, specifically, a communication sequence in which the setting terminal 2 transmits, to the controller 4, setting information for the air conditioning system 1, that is, floor map information and connection setting information.

The installer 7 operates the setting terminal 2 to input necessary information (step S111). The setting terminal 2 generates floor map information and connection setting information in accordance with the operation from the installer 7, and transmits the floor map information and the connection setting information to the controller 4 (step S112). Upon receiving the floor map information and the connection setting information, the controller 4 transmits information indicating the successful reception to the setting terminal 2 (step S113). The setting terminal 2 notifies the installer 7 that the transmission of the floor map information and the connection setting information to the controller 4 has been completed (step S114).

The sequence 102 illustrated in FIG. 5 is a first communication sequence between the user terminal 3 and the controller 4, specifically, a communication sequence in which the user terminal 3 transmits, to the controller 4, user registration information including the identification information and positional information on the user 8.

The user 8 operates the user terminal 3 to input necessary information (step S121). The user terminal 3 generates user registration information in accordance with the operation from the user 8, and transmits the user registration information to the controller 4 (step S122). Upon receiving the user registration information, the controller 4 transmits information indicating the successful reception to the user terminal 3 (step S123). The user terminal 3 notifies the user 8 that the transmission of the user registration information to the controller 4 has been completed (step S124).

The sequence 103 illustrated in FIG. 5 is a communication sequence between the sensor terminal 5 and the controller 4.

The sensor terminal 5 transmits a connection signal to the controller 4 (step S131). A connection signal is a signal that is transmitted to check whether the sensor terminal 5 is communicable with the controller 4, that is, whether the wireless connection is maintained. The sensor terminal 5 periodically transmits connection signals. Upon receiving a connection signal, the controller 4 transmits a connection request signal to the sensor terminal 5 that is the transmission source of the connection signal (step S132). Upon receiving the connection request signal, the sensor terminal 5 transmits, to the controller 4, a connection response signal including information indicating the successful reception (step S133), whereby the checking of the connection state between the sensor terminal 5 and the controller 4 is completed. While the sensor terminal 5 is connected, the controller 4 periodically transmits signals requesting measurement values to the sensor terminal 5 (step S134). In this step S134, the controller 4 transmits signals requesting measurement values to all the connected sensor terminals 5. Upon receiving a signal requesting a measurement value, the sensor terminal 5 transmits a measurement value to the controller 4 (step S135).

The sequence 104 illustrated in FIG. 5 is a second communication sequence between the user terminal 3 and the controller 4, specifically, a communication sequence in which the user terminal 3 transmits, to the controller 4, user information that is information about the user 8.

For example, when the user 8 enters the room 6 illustrated in FIG. 2, the user 8 performs, on the user terminal 3, an operation for setting user information in the controller 4 (step S141). The user terminal 3 generates user information including the identification information and target temperature information on the user in accordance with the operation from the user 8, and transmits the user information to the controller 4 (step S142). Upon receiving the user information, the controller 4 transmits information indicating the successful reception to the user terminal 3 (step S143). The user terminal 3 notifies the user 8 that the transmission of the user information to the controller 4 has been completed (step S144).

Next, the operation of each device constituting the air conditioning system 1 will be described using flowcharts.

Figure 6:
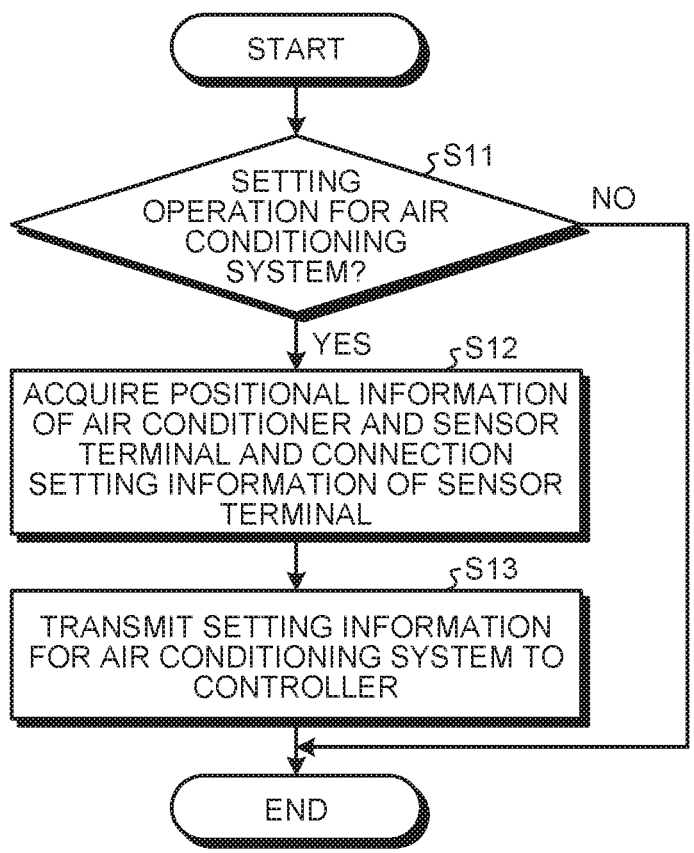
FIG. 6 is a flowchart illustrating an example of the operation of a setting terminal according to the embodiment.

Below is a description of the operation of the setting terminal 2. FIG. 6 is a flowchart illustrating an example of the operation of the setting terminal 2 according to the embodiment. The operation illustrated in FIG. 6 starts when the setting terminal 2 is operated by the installer 7.

The setting terminal 2 checks whether the operation by the installer 7 is setting operation for the air conditioning system 1, that is, whether an operation for starting to configure the settings of the air conditioning system 1 has been performed by the installer 7 (step S11). If the operation by the installer 7 is not setting operation for the air conditioning system 1 (step S11: No), the setting terminal 2 ends the operation. If the operation by the installer 7 is setting operation for the air conditioning system 1 (step S11: Yes), the setting terminal 2 acquires the positional information on the air conditioner, or the equipment 20, the positional information on the sensor terminal 5, and the connection setting information on the sensor terminal 5 (step S12). The positional information on the air conditioner indicates the position where the indoor unit of the air conditioner is installed. In step S12, the setting terminal 2 receives an input of the positional information indicating the installation position of the indoor unit of the air conditioner and the positional information indicating the installation position of the sensor terminal 5. The setting terminal 2 further receives an input of information required for the sensor terminal 5 and the controller 4 to be wirelessly connected. In order for the setting terminal 2 to receive an input of the positional information indicating the installation positions of the indoor unit and the sensor terminal 5, for example, the sensor terminal 2 displays the floor plan of the room 6 equipped with the indoor unit and the sensor terminal 5 so that positions on the floor plan can be selected, thereby acquiring the positional information indicating the installation positions of the indoor unit and the sensor terminal 5. Note that the data on the floor plan of the room 6 may be stored in the setting terminal 2, or the controller 4 may store the data on the floor plan of the room 6 so that the setting terminal 2 can acquire the data on the floor plan from the controller 4 as necessary. Alternatively, the setting terminal 2 may receive an input of the data on the floor plan of the room 6 from the installer 7.

In step S12, the setting terminal 2 may acquire positional information and connection setting information for a plurality of sensor terminals 5. In response to acquiring the positional information on the indoor unit and the positional information and connection setting information on the sensor terminal 5, the setting terminal 2 generates floor map information including the positional information on the indoor unit and the sensor terminal 5. Then, the setting terminal 2 transmits the floor map information and the connection setting information on the sensor terminal 5 to the controller 4 as setting information for the air conditioning system 1 (step S13).

Figure 7:
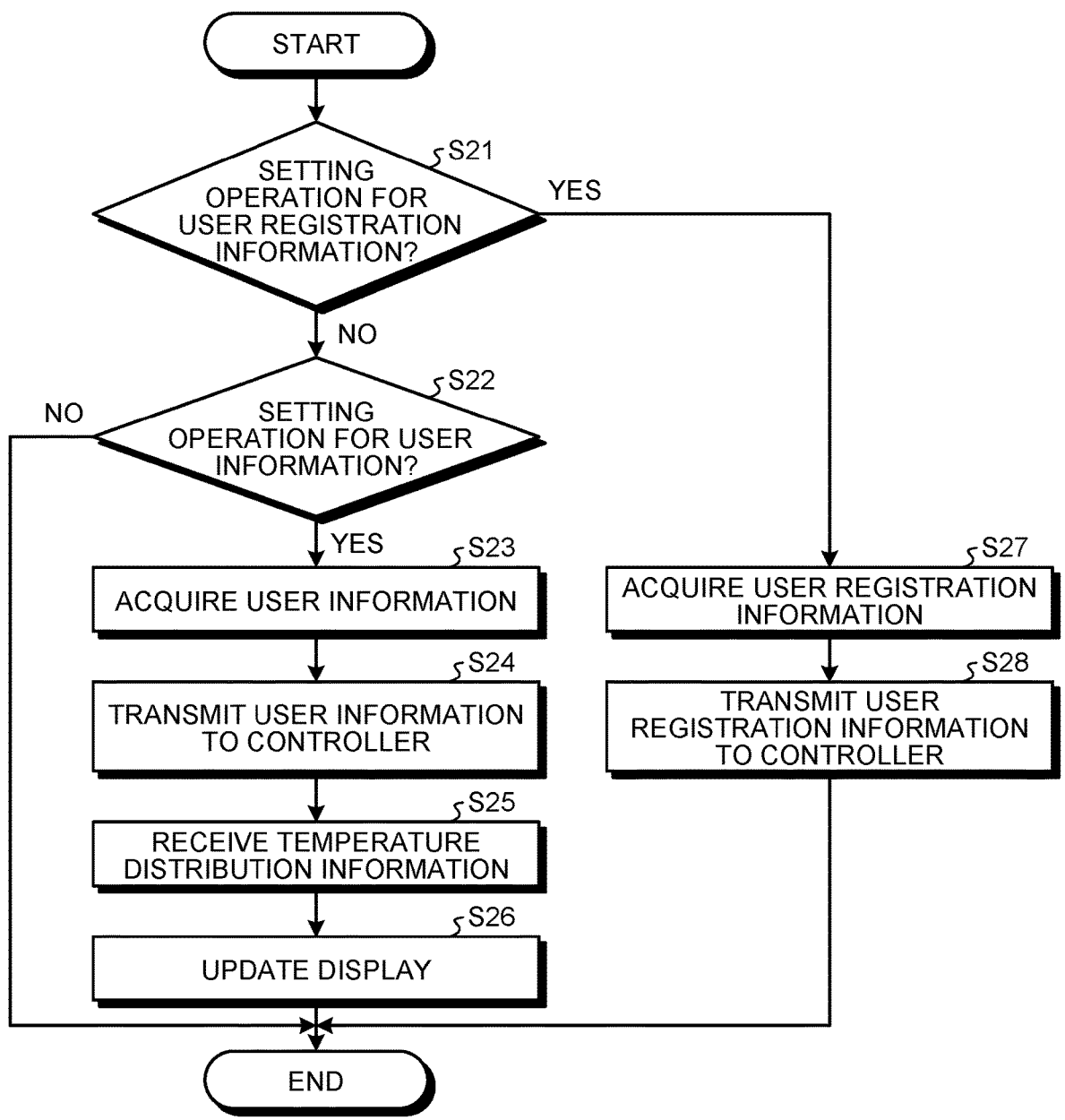
FIG. 7 is a flowchart illustrating an example of the operation of a user terminal according to the embodiment.

Below is a description of the operation of the user terminal 3. FIG. 7 is a flowchart illustrating an example of the operation of the user terminal 3 according to the embodiment. The operation illustrated in FIG. 7 starts when the user terminal 3 is operated by the user 8.

The user terminal 3 checks whether the operation by the user 8 is setting operation for user registration information, that is, whether an operation for starting to configure the settings of user registration information has been performed by the user 8 (step S21). If the operation by the user 8 is setting operation for user registration information (step S21: Yes), the user terminal 3 acquires user registration information (step S27). As described above, user registration information includes the identification information and positional information on the user 8. The user terminal 3 acquires the identification information on the user 8, for example, by displaying a menu screen that receives an input of the identification information on the user 8 on the display unit and causing the user 8 to input the identification information. In addition, the user terminal 3 acquires information on the position that the user 8 occupies when staying in the room, for example, by displaying the floor plan of the room 6 and causing the user 8 to select a position on the floor plan. Information on the position that the user 8 occupies when staying in the room is the positional information on the user 8. Note that the data on the floor plan of the room 6 may be stored in the user terminal 3, or the controller 4 may store the data on the floor plan of the room 6 so that the user terminal 3 can acquire the data on the floor plan from the controller 4 as necessary. In response to acquiring the user registration information, the user terminal 3 transmits the user registration information to the controller 4 (step S28).

If the operation by the user 8 is not setting operation for user registration information (step S21: No), the user terminal 3 checks whether the operation is setting operation for user information, that is, whether an operation for starting to configure the settings of user information has been performed by the user 8 (step S22). If the operation by the user 8 is not setting operation for user information (step S22: No), the user terminal 3 ends the operation. If the operation by the user 8 is setting operation for user information (step S22: Yes), the user terminal 3 acquires user information (step S23). As described above, user information includes the identification information and target temperature information on the user 8. The user terminal 3 acquires the identification information on the user 8, for example, by displaying a menu screen that receives an input of the identification information on the user 8 on the display unit and causing the user 8 to input the identification information. The user terminal 3 acquires target temperature information, for example, by displaying a menu screen that receives an input of the target temperature desired by the user 8 on the display unit and causing the user 8 to input the target temperature. In response to acquiring the user information, the user terminal 3 transmits the user information to the controller 4 (step S24). The menu screen for receiving an input of the target temperature desired by the user 8 may be configured to receive a numerical input of the target temperature, or may prepare an operation button for causing the user 8 to select his/her feeling such as "hot" or "cold" so that the target temperature can be abstractly input through the operation button. In this case, when the operation button "hot" is pressed, the user terminal 3 transmits, to the controller 4, user information including target temperature information indicating that the target temperature is to be reduced by a predetermined numerical value. In addition, when the operation button "cold" is pressed, the user terminal 3 transmits, to the controller 4, user information including target temperature information indicating that the target temperature is to be increased by a predetermined numerical value.

Figure 8:
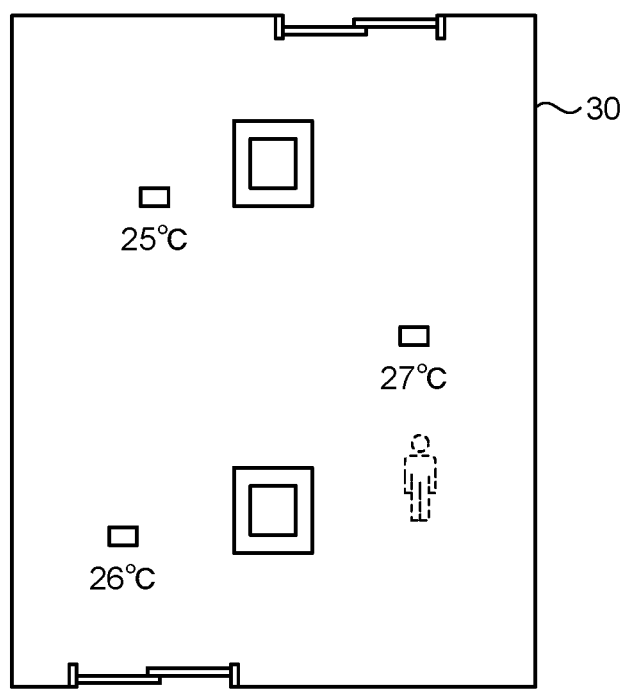
FIG. 8 is a diagram illustrating an example of a temperature distribution screen displayed when the user terminal according to the embodiment receives temperature distribution information.

After transmitting the user information, the user terminal 3 receives the temperature distribution information transmitted from the controller 4 that has received the user information (step S25), and updates the display on the display unit on the basis of the received temperature distribution information (step S26). FIG. 8 is a diagram illustrating an example of a temperature distribution screen displayed when the user terminal 3 according to the embodiment receives temperature distribution information. Upon receiving the temperature distribution information, the user terminal 3 switches the display on the display unit to a temperature distribution display 30 illustrated in FIG. 8, for example. After transmitting the user information in step S24, the user terminal 3 may periodically transmit, to the controller 4, signals requesting the transmission of temperature distribution information, and every time the user terminal 3 receives temperature distribution information, may show the temperature distribution display 30 that is based on the received temperature information. In this case, the user terminal 3 may transmit user information that is the same as the user information transmitted in step S24 as a signal requesting the transmission of temperature distribution information.

When receiving an operation by the user 8 and executing step S23, the user terminal 3 stores the acquired user information. Thereafter, the user terminal 3 may receive no operation by the user, in which case the user terminal 3 executes steps S24 to S26 if a specific condition is satisfied, and displays the temperature distribution. Here, a specific condition is, for example, a case where the current time is between the first time and the second time preset by the user 8. In this case, the user terminal 3 only needs to acquire the information on the first time and the second time in addition to the user information in step S23. For example, in a case where the room 6 equipped with the air conditioning system 1 is a company office, the user 8 sets, on the user terminal 3, the scheduled attendance time as the first time and the scheduled leaving time as the second time, and the user terminal 3 periodically executes steps S24 to S26 during the period from the first time to the second time. Accordingly, the user 8 can instruct the controller 4 to adjust the ambient temperature of the user 8 to the target temperature without operating the user terminal 3 while staying in the room 6. As another example, the user terminal 3 may acquire its positional information using the global positioning system (GPS), for example, and periodically execute steps S24 to S26 while the distance between the user terminal 3 and the position designated in advance by the user 8 is equal to or less than a threshold. In this case, the user 8 designates in advance the position that the user 8 occupies when staying in the room 6 equipped with the air conditioning system 1, so that the user 8 can instruct the controller 4 to adjust the ambient temperature of the user 8 to the target temperature without operating the user terminal 3 while staying in the room 6.

Figure 9:
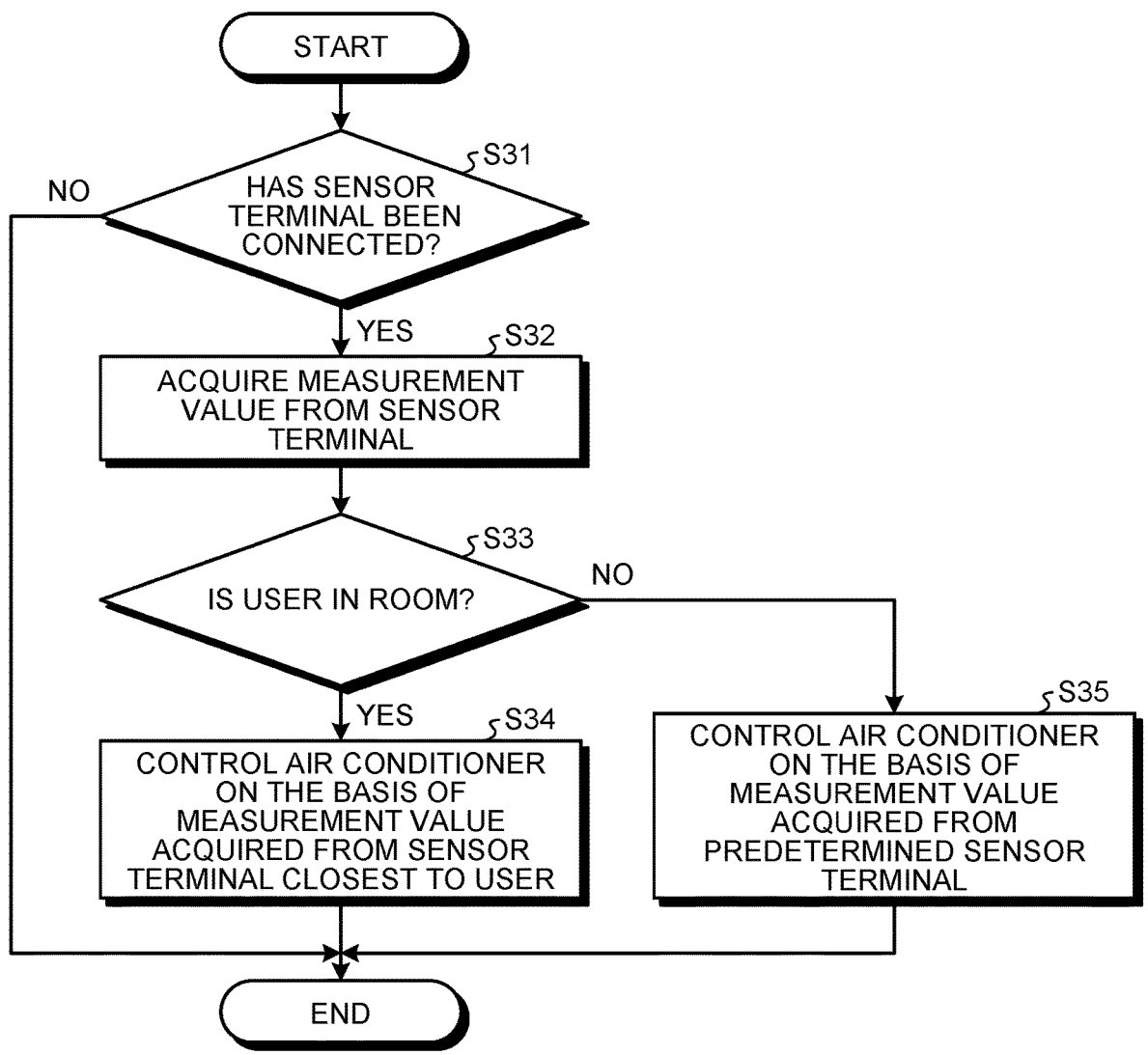
FIG. 9 is a flowchart illustrating an example of the first operation performed by the controller according to the embodiment.
Figure 10:
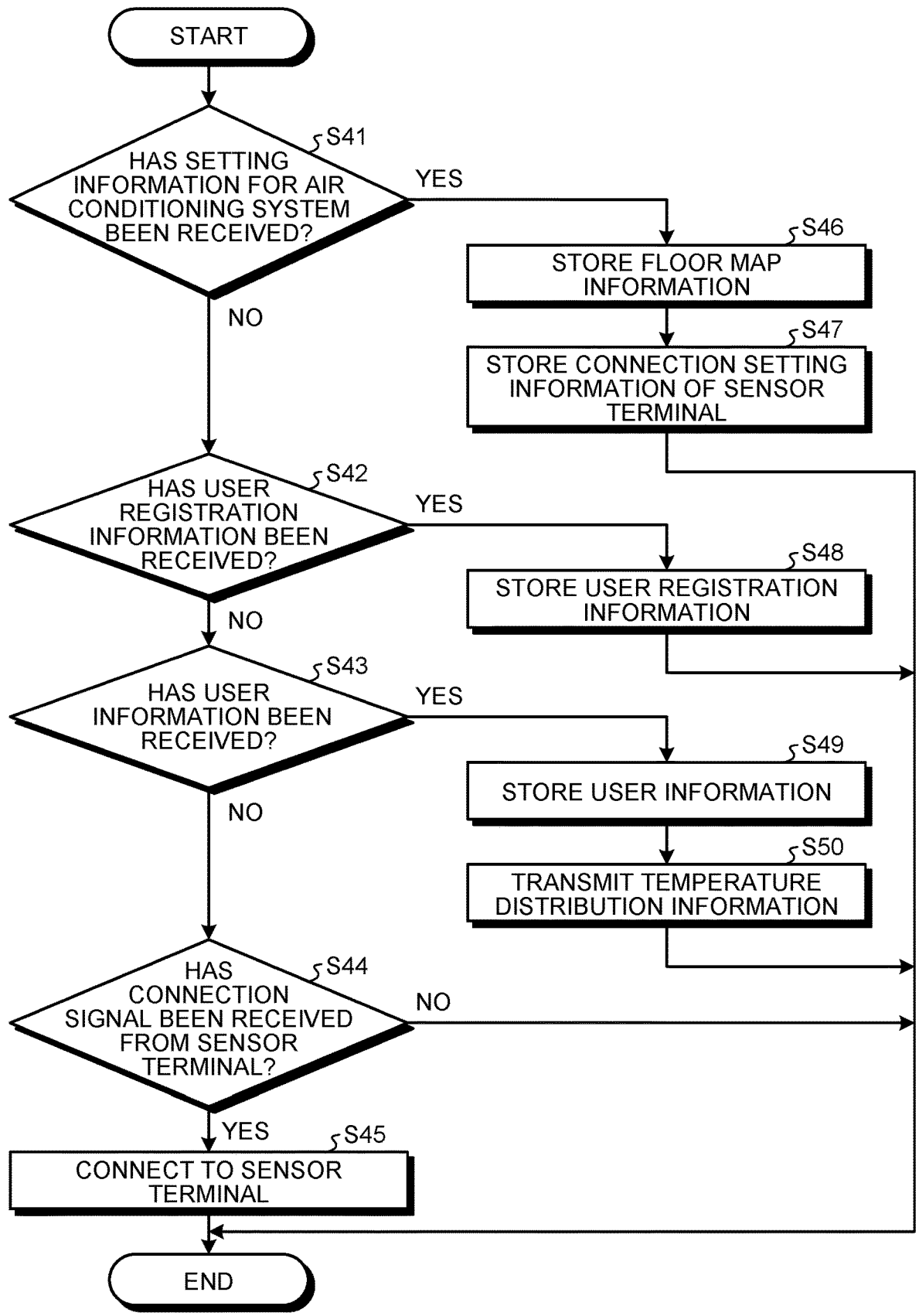
FIG. 10 is a flowchart illustrating an example of the second operation performed by the controller according to the embodiment.

The operation of the controller 4 will be described with reference to FIGS. 9 and 10. FIG. 9 is a flowchart illustrating an example of the first operation performed by the controller 4 according to the embodiment. The first operation illustrated in FIG. 9 starts periodically, that is, every time a predetermined time elapses. FIG. 10 is a flowchart illustrating an example of the second operation performed by the controller 4 according to the embodiment. The second operation illustrated in FIG. 10 starts when the controller 4 receives a signal.

Below is a description of the operation illustrated in FIG. 9. After a lapse of a predetermined time, the controller 4 checks whether the sensor terminal 5 has been connected (step S31). The controller 4 determines that the sensor terminal 5 has been connected if steps S131 to S133 of the sequence 103 illustrated in FIG. 5 have been executed for all the registered sensor terminals 5. The registered sensor terminals 5 are the sensor terminals 5 whose connection setting information is stored in the connection-setting-information storing unit 73. If the sensor terminal 5 has not been connected (step S31: No), the controller 4 ends the operation.

If the sensor terminal 5 has been connected (step S31: Yes), the controller 4 acquires a measurement value from the sensor terminal 5 (step S32). If there are a plurality of connected sensor terminals 5, the controller 4 acquires measurement values from all the connected sensor terminals 5. Next, the controller 4 checks whether the user 8 is in the room (step S33). For example, if the controller 4 has received the user information on the registered user 8 during the last fixed period of time, the controller 4 determines that the user 8 is in the room. A fixed period of time is, for example, one minute. Here, the registered user 8 is the user 8 whose user registration information is stored in the user-registration-information storing unit 72. That is, in response to receiving the user information on the registered user 8, the controller 4 determines that the user 8 indicated by the identification information included in the received user information is in the room. After receiving the user information on the registered user 8, if a fixed period of time has elapsed without receiving the user information on the same user 8, the controller 4 determines that the user 8 indicated by the identification information included in the unreceived user information has gone out of the room. That is, if a fixed period of time has elapsed since the last reception of the user information on the registered user 8 without receiving the user information on the same user 8, the controller 4 determines that the user 8 indicated by the identification information included in the unreceived user information is not in the room. The operation of determining the presence or absence of the user 8 in the room on the basis of the reception state of the user information is performed by, for example, the user information acquiring unit 63. In this case, the user information acquiring unit 63 notifies the air-conditioning control unit 66 of the result of determination of the presence or absence of the user 8 in the room.

If the user 8 is in the room (step S33: Yes), the controller 4 controls the air conditioner on the basis of the measurement value acquired from the sensor terminal 5 closest to the user 8 in the room (step S34). Specifically, the air-conditioning control unit 66 of the controller 4 controls the equipment 20, or the air conditioner, such that the detected temperature indicated by the measurement value acquired from the sensor terminal 5 closest to the position indicated by the positional information on the user 8 in the room approaches the temperature indicated by the target temperature information included in the user information on the user 8 in the room. For example, when the difference between the first temperature indicated by the measurement value acquired from the sensor terminal 5 closest to the position of the user 8 in the room and the second temperature indicated by the target temperature information included in the user information on the user 8 in the room is equal to or greater than a predetermined threshold, the air-conditioning control unit 66 instructs the equipment 20 to make the first temperature approach the second temperature. The threshold used here may be changed according to the distance from the position of the user 8 to the sensor terminal 5 closest to the position of the user 8. For example, the threshold is increased when the distance is short, and the threshold is reduced when the distance is long. If there are a plurality of users 8 in the room, the air-conditioning control unit 66 controls the equipment 20 for each user 8 such that the measurement value acquired from the sensor terminal 5 closest to the user 8 approaches the temperature indicated by the target temperature information corresponding to the user 8.

If the user 8 is not in the room (step S33: No), the controller 4 controls the air conditioner on the basis of the measurement value acquired from the predetermined sensor terminal 5 (step S35). In this case, the air-conditioning control unit 66 of the controller 4 controls the equipment 20, for example, such that the measurement value acquired from one or more sensor terminals 5 designated in advance by the installer 7 approaches the temperature set as the default value.

Below is a description of the operation illustrated in FIG. 10. Upon receiving a signal, the controller 4 checks whether setting information for the air conditioning system 1 has been received (step S41). If setting information for the air conditioning system 1 has been received (step S41: Yes), the controller 4 causes the storage unit 70 to store the floor map information and the connection setting information on the sensor terminal 5 included in the received setting information (steps S46 and S47). The floor map information is stored by the floor-map-information storing unit 71, and the connection setting information on the sensor terminal 5 is stored by the connection-setting-information storing unit 73.

If setting information for the air conditioning system 1 has not been received (step S41: No), the controller 4 checks whether user registration information has been received (step S42). If user registration information has been received (step S42: Yes), the controller 4 causes the storage unit 70 to store the received user registration information (step S48). The user registration information is stored by the user-registration-information storing unit 72.

If user registration information has not been received (step S42: No), the controller 4 checks whether user information has been received (step S43). If user information has been received (step S43: Yes), the controller 4 causes the storage unit 70 to store the received user information (step S49). The user information is stored by the user information storing unit 74. After storing the user information, the controller 4 generates temperature distribution information, and transmits the temperature distribution information to the user terminal that is the transmission source of the user information (step S50). The generation and transmission of temperature distribution information are performed by the temperature-distribution-information generating unit 65. The temperature-distribution-information generating unit 65 generates temperature distribution information on the basis of the positional information on the user indicated by the identification information included in the received user information, the measurement value acquired from each sensor terminal 5, and the floor map information. The temperature distribution information includes, for example, the positional information on the indoor unit of the air conditioner, the positional information on each sensor terminal 5, the measurement value acquired from each sensor terminal 5, the positional information on the user 8, and the floor plan of the room 6 equipped with the indoor unit and each sensor terminal 5.

If user information has not been received (step S43: No), the controller 4 checks whether a connection signal has been received from the sensor terminal 5 (step S44). If a connection signal has been received from the sensor terminal 5 (step S44: Yes), the controller 4 connects to the sensor terminal 5 that is the transmission source of the connection signal (step S45). In step S45, the controller 4 transmits a connection request signal to the sensor terminal 5, and connects to the sensor terminal 5.

If a connection signal has not been received from the sensor terminal 5 (step S44: No), the controller 4 ends the operation.

Note that the order in which the controller 4 executes steps S41 to S44 may be changed. In a case where the order of steps S41 to S44 is changed, the controller 4 proceeds to the next determination when the determination in any of the first to third steps is "No", and ends the operation when the determination in the fourth step is "No". When the determination in each of these steps is "Yes", the controller 4 executes the step(s) corresponding to the content of the received signal.

Figure 11:
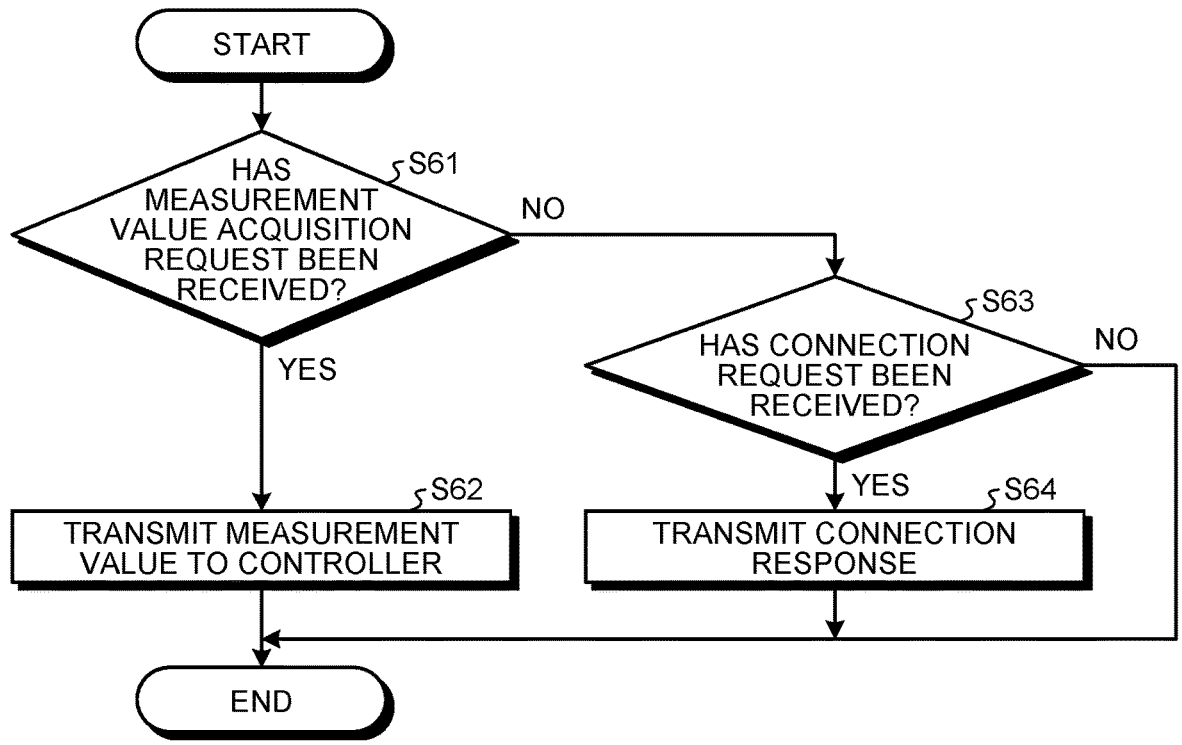
FIG. 11 is a flowchart illustrating an example of the first operation performed by a sensor terminal according to the embodiment.
Figure 12:
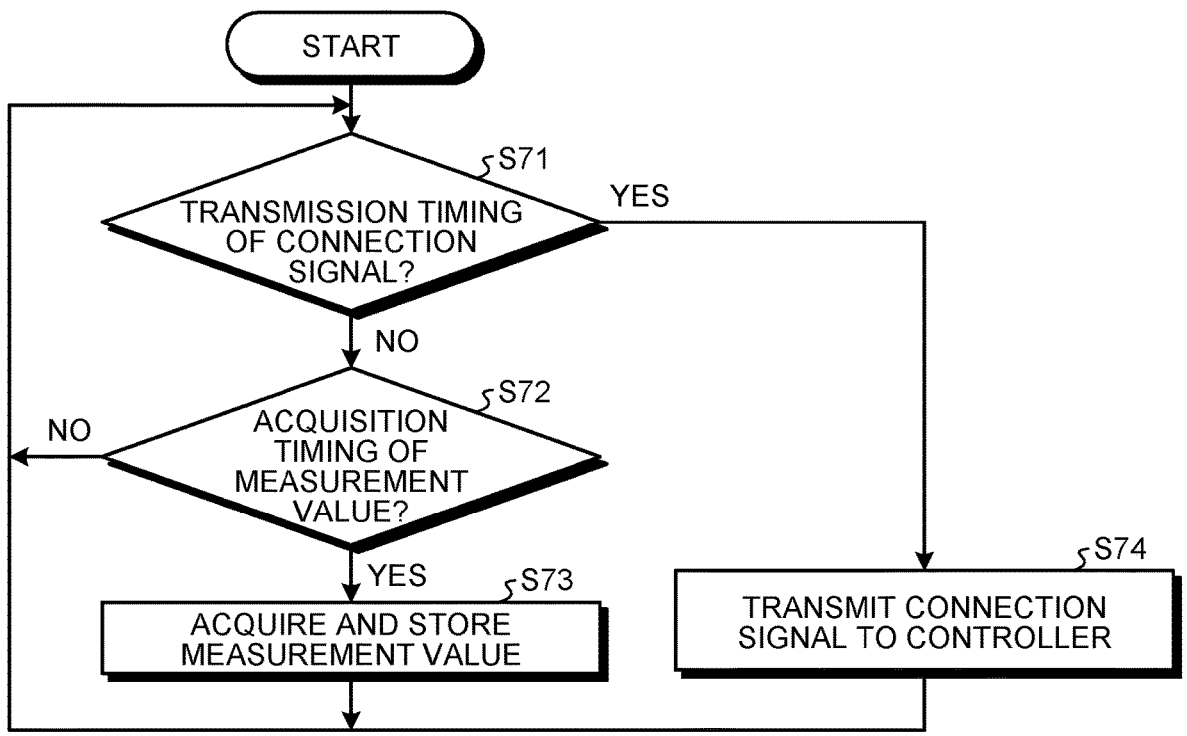
FIG. 12 is a flowchart illustrating an example of the second operation performed by the sensor terminal according to the embodiment.

The operation of the sensor terminal 5 will be described with reference to FIGS. 11 and 12. FIG. 11 is a flowchart illustrating an example of the first operation performed by the sensor terminal 5 according to the embodiment. The first operation illustrated in FIG. 11 starts when the sensor terminal 5 receives a signal. FIG. 12 is a flowchart illustrating an example of the second operation performed by the sensor terminal 5 according to the embodiment. The second operation illustrated in FIG. 12 starts when the sensor terminal 5 is activated.

Below is a description of the operation illustrated in FIG. 11. Upon receiving a signal, the sensor terminal 5 checks whether a measurement value acquisition request has been received (step S61). If a measurement value acquisition request has not been received (step S61: No), the sensor terminal 5 checks whether a connection request has been received (step S63). If a connection request has not been received (step S63: No), the sensor terminal 5 ends the operation. If a measurement value acquisition request has been received (step S61: Yes), the sensor terminal 5 transmits a measurement value to the controller 4 (step S62). If a connection request has been received (step S63: Yes), the sensor terminal 5 transmits a connection response to the controller 4 (step S64).

Below is a description of the operation illustrated in FIG. 12. The sensor terminal 5 checks whether the transmission timing of a connection signal has come, that is, whether a predetermined first period of time has elapsed since the last transmission of a connection signal (step S71). If the transmission timing of a connection signal has not come (step S71: No), the sensor terminal 5 checks whether the acquisition timing of a measurement value has come, that is, whether a predetermined second period of time has elapsed since the last acquisition of a measurement value (step S72). If the acquisition timing of a measurement value has not come (step S72: No), the sensor terminal 5 returns to step S71.

If the transmission timing of a connection signal has come (step S71: Yes), the sensor terminal 5 transmits a connection signal to the controller 4 (step S74), and returns to step S71. If the acquisition timing of a measurement value has come (step S72: Yes), the sensor terminal 5 acquires and stores a measurement value (step S73), and returns to step S71.

Figure 13:
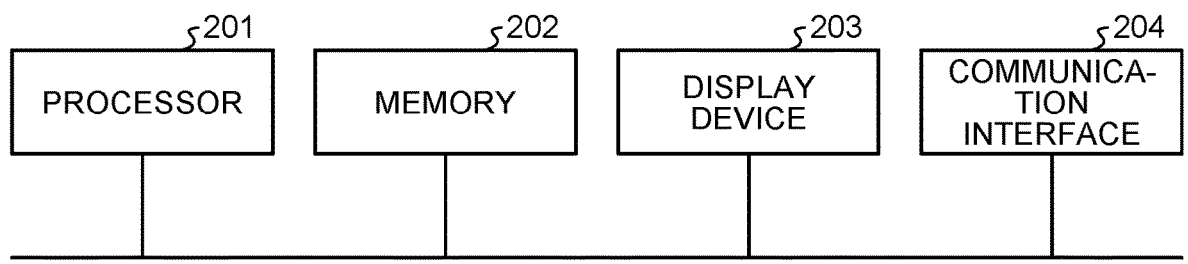
FIG. 13 is a diagram illustrating an example of hardware that implements the controller according to the embodiment.

Next, the hardware configuration of the controller 4 according to the present embodiment will be described. FIG. 13 is a diagram illustrating an example of hardware that implements the controller 4 according to the embodiment. The controller 4 can be implemented by a processor 201, a memory 202, a display device 203, and a communication interface 204 illustrated in FIG. 13.

The processor 201 is a central processing unit (CPU, also referred to as a central processing device, a processing device, an arithmetic device, a microprocessor, a microcomputer, a processor, or a digital signal processor (DSP)) or the like. The memory 202 corresponds to, for example, a nonvolatile or volatile semiconductor memory such as a random access memory (RAM), a read only memory (ROM), or a flash memory. The display device 203 is a liquid crystal panel or the like. The display device 203 may be a touch panel in which an input device and a display device are integrated. The communication interface 204 is processing circuitry for transmitting and receiving signals to and from the setting terminal 2, the user terminal 3, the sensor terminal 5, and the equipment 20.

The control unit 60 of the controller 4 is implemented by the processor 201 and the communication interface 204. That is, the setting information acquiring unit 61, the user-registration-information acquiring unit 62, the user information acquiring unit 63, the measurement value acquiring unit 64, the temperature-distribution-information generating unit 65, and the air-conditioning control unit 66 of the control unit 60 are implemented by the processor 201 executing a program for operating as each of these units and transmitting/receiving information to/from an external device using the communication interface 204. Programs for operating as the setting information acquiring unit 61, the user-registration-information acquiring unit 62, the user information acquiring unit 63, the measurement value acquiring unit 64, the temperature-distribution-information generating unit 65, and the air-conditioning control unit 66 are stored in the memory 202 in advance. The processor 201 reads the programs from the memory 202 and executes the programs, thereby operating as the setting information acquiring unit 61, the user-registration-information acquiring unit 62, the user information acquiring unit 63, the measurement value acquiring unit 64, the temperature-distribution-information acquiring unit 65, and the air-conditioning control unit 66.

The storage unit 70 of the controller 4 is implemented by the memory 202. That is, the floor-map-information storing unit 71, the user-registration-information storing unit 72, the connection-setting-information storing unit 73, and the user information storing unit 74 of the storage unit 70 are implemented by the memory 202.

Note that the display device 203 illustrated in FIG. 13 is used when the controller 4 displays the operation state of the equipment 20, for example.

As described above, in the air conditioning system 1 according to the present embodiment, the controller 4 stores floor map information indicating the position of the indoor unit of the air conditioner and the position of each of the plurality of sensor terminals 5, and stores positional information indicating the position that the user 8 occupies when staying in the room. When the user 8 is in the room, the controller 4 controls the air conditioner on the basis of the measurement value obtained by the sensor terminal 5 closest to the user 8. Specifically, the controller 4 controls the air conditioner such that the measurement value acquired from the sensor terminal 5 closest to the position occupied by the registered user 8 approaches the target temperature set by the user 8. This can prevent an increase in the error between the temperature set by the user 8 and the actual temperature at the position occupied by the user 8, and can improve comfort. Because the controller 4 acquires in advance, from the user terminal 3, and stores the position that the user occupies when staying in the room, the control can be simplified and the processing load can be reduced.

In the controller 4 of the present embodiment, the air-conditioning control unit 66 controls the air conditioner on the basis of the measurement value obtained by the sensor terminal 5 closest to the user 8. Alternatively, the air-conditioning control unit 66 may control the air conditioner on the basis of the measurement value obtained by one or more sensor terminals 5 located at a distance of a predetermined value or less from the user 8. For example, the air-conditioning control unit 66 may control the air conditioner such that the average of the measurement values obtained by one or more sensor terminals 5 located at a distance of a predetermined value or less from the user 8 approaches the target temperature. Alternatively, the air-conditioning control unit 66 may calculate an estimate of the temperature at the position occupied by the user 8 on the basis of the measurement value obtained by one or more sensor terminals 5 located at a distance of a predetermined value or less from the user 8, and control the air conditioner such that the calculated estimate approaches the target temperature.

The configurations described in the above-mentioned embodiments indicate examples of the contents of the present invention. The configurations can be combined with another well-known technique, and some of the configurations can be omitted or changed in a range not departing from the gist of the present invention.

The invention claimed is:

1. A controller comprising:
 a processor; and
 a memory connected to the processor,
 the memory stores:
  floor map information indicating a position, among a plurality of sensor terminal installation positions in a room, of each of a plurality of sensor terminals installed in the room, the room being air-conditioned by an air conditioner; and
  user registration information comprising first identification information and positional information, the first identification information indicating a user, the user having potential to be in the room, the positional information indicating a predetermined position, among a plurality of different selectable floor plan positions in the room, designated in advance as occupied by the user when the user is in the room;
 wherein the processor is configured to
  periodically acquire, from a user terminal adapted to be carried by the user, user information comprising second identification information and target temperature information, the second identification information indicating the user using the user terminal; and determine, responsive to acquiring the user information on the user, that the user using the user terminal is staying in the room;
  control, when the user using the user terminal is determined to be in the room, the air conditioner such that the temperature approaches a target temperature indicated in the target temperature information acquired from the user terminal, the temperature being detected by one of the sensor terminals at a position closest to the user in the room as indicated by the positional information previously stored in the stored user registration information and the position of the sensor terminal indicated in the floor map information; and
  control the air conditioner, responsive to determining that the user using the user terminal is not in the room, such that a temperature acquired from one or more of the plurality of sensor terminals designated in advance approaches a default value previously set
 wherein the processor is further configured to
  when a difference between a detected temperature and the target temperature is equal to or greater than a threshold, control the air conditioner such that the detected temperature becomes the target temperature, the detected temperature being a temperature detected by the sensor terminal at the position closest to the user,
  wherein the threshold varies depending on a distance from a position of the user using the user terminal to the sensor terminal at the position closest to the user.

2. The controller according to claim 1, wherein the processor is further configured to
generate temperature distribution information on a basis of the second identification information, the floor map information, and the user registration information, and transmit the temperature distribution information to the user terminal, the temperature distribution information representing a state of temperature in the room.

3. The controller according to claim 1, wherein
the positional information stored by the processor indicates the predetermined position which is predetermined by the user.

4. An air conditioning system comprising:
the controller according to claim 1;
an air conditioner operating in accordance with an instruction from the controller;
the plurality of sensor terminals installed in the room, the sensor terminals measuring a temperature and transmitting a measurement value of the temperature to the controller; and
the user terminal receiving an input of the user information from the user and transmitting the user information to the controller.

5. The air conditioning system according to claim 4, wherein
the user terminal has a function of receiving an abstract designation of the target temperature by the user.

6. The air conditioning system according to claim 1, wherein
the memory stores, for each user of a plurality of users, the user registration information, the each user having potential to be among the plurality of users in the room, the each user having corresponding thereto a predetermined position among the plurality of different selectable floor plan positions,
the processor is further configured to
responsive to a determination that the each user using the user terminal of the each user is anywhere in the room, individually control the temperature at each predetermined position corresponding to the each user to the each user's target temperature information from the user terminal of the each user.

7. The air conditioning system according to claim 1, wherein
the threshold is increased when the distance is short, and the threshold is reduced when the distance is long.

* * * * *